United States Patent [19]

Delaney

[11] Patent Number: 4,538,737

[45] Date of Patent: Sep. 3, 1985

[54] ADJUSTABLE PACKAGE CARRIER

[76] Inventor: Samuel T. Delaney, 3400 Nantucket Dr., Lexington, Ky. 40502

[21] Appl. No.: 499,858

[22] Filed: Jun. 1, 1983

[51] Int. Cl.³ .......................... A47G 29/00; B65D 6/26
[52] U.S. Cl. ...................................... 211/71; 206/560; 211/126; 211/184; 220/22.3; 294/165
[58] Field of Search ................... 294/141–144, 294/164–169; 206/560, 561; 211/43, 184; 220/22.2, 22.3, 22.5

[56] References Cited

U.S. PATENT DOCUMENTS

| | | | |
|---|---|---|---|
| 386,674 | 7/1888 | Wells . | |
| 1,521,470 | 12/1924 | Pearl . | |
| 4,130,203 | 12/1978 | Russell, III | 211/126 |
| 4,385,781 | 5/1983 | Welsch et al. | 294/162 |

*Primary Examiner*—Johnny D. Cherry
*Attorney, Agent, or Firm*—King, Liles and Schickli

[57] ABSTRACT

An article carrier is provided with adjustable side walls pivotally mounted on a base and clamped to hold articles in place. To provide the pivoting action, the base includes a plurality of holes in two parallel rows for loosely receiving a pair of connecting pegs from each of the side walls. This arrangement allows for the angle and distance between the side walls to be altered to generally conform with the size and shape of the articles within the carrier. The side walls are connected together with elongated cross members, each including a slot substantially throughout the length for receiving threaded connectors from each side wall. Wing nuts are provided to secure the side walls to the cross members following adjustment and rigidify the carrier for securely holding the articles. A stored position is provided by the two walls laying flat on the base, the cross members on top and the wing nuts screwed on retaining posts on the base.

8 Claims, 4 Drawing Figures

ADJUSTABLE PACKAGE CARRIER

BACKGROUND OF THE INVENTION

The present invention relates generally to article carriers, and more particularly to an adjustable article carrier wherein the distance between the sidewalls may be adjusted to conform to the size and general shape of the articles within the carrier.

There is a need for a portable article carrier allowing adjustment to securely hold articles of various sizes and shapes safely in place. This need, however, has never been completely satisfied by the carriers available in the marketplace.

The inconvenience and irritation of a full grocery sack tipping over in a car is well known. This is not to mention actual loss in terms of crushed eggs, burst milk cartons and broken bottles or jars that are sometimes a result. In an effort to alleviate the problem, some people have been known to keep a cardboard box in their car for holding the grocery sacks upright. A regular box, however, includes fixed walls providing no adjustment to the size of the articles being carried. Therefore, unless the dimensions of the box match the dimensions of the articles to be carried, the box will not provide the support sufficient to hold the articles in the upright position. Also, after a few uses the cardboard sides may become bent or bowed outwardly. This condition allows a top-heavy grocery sack(s) to lean over sufficiently to tip the box and spill the contents, thus defeating the purpose.

Also, typically, a cardboard box or carton cannot be folded up into a compact form when not in use. Quite often, this means that the box is stored in the garage or other storage area outside the car with its availability as an article carrier dependent upon the person remembering to place it in the car when its use is anticipated.

Other prior art article holders or carriers for other purposes suffer from a lack of adaptability to the problem of supporting this type of article. The carriers inherently do not allow sufficient adjustment to meet the demands of the job. U.S. Pat. No. 1,521,470 to Pearl discloses such a storage device for holding a stack of papers. The distance between the sides is not adjustable as the bottom corners of the side panels are pinned into slots in the cooperating end panels. Therefore, this device is limited to holding a stack of papers or the like of relatively light weight and within a narrow range of width dimensions.

SUMMARY OF THE INVENTION

Accordingly, it is the primary object of the present invention to provide a carrier designed to overcome the limitations and disadvantages of the prior art.

Another object of the invention is to provide a highly stable article carrier of relatively lightweight material which is portable and may be easily broken down and stored in compact form when not in use.

An additional object of the invention is to provide an article carrier wherein the distance between the side walls may be adjusted to conform generally to the size and shape of the articles within the carrier.

Still another object of the invention is to provide an article carrier that includes upstanding side walls that may be inclined and securely clamped to hold relatively heavy articles within the carrier in place and upright to prevent tipping.

Still another object is to provide a carrier for holding articles upright and in position during transport in a vehicle.

Also, an object of the invention is to provide a carrier for supporting articles that is simple in design and inexpensive to manufacture.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an article carrier is provided for adjustably receiving articles and securely holding them in place. The invention includes a base, a pair of side walls and cross members for connecting the side walls. Rough adjustment is provided for the distance between each of the side walls along the base in order to provide initial matching of the size of the articles and the carrier. Each side wall is further pivotally adjustable in relation to the base to provide the final snug engagement and secure retention of the articles.

Each side wall includes a pair of pegs extending from the bottom edge thereof. These pegs may be received in any of a plurality of holes in two parallel rows along the base to allow the rough adjustment. Preferably, the pegs fit loosely in the holes thereby allowing the pivotal adjustment of the side walls with respect to the base.

A plurality of threaded connecting pins extend from both side edges of the side walls. These pins are received in cross support members which preferably include a longitudinal slot running substantially throughout their length. Wing nuts are received on the connecting pins to secure the position of the side walls along the cross members.

When the article carrier is not in use, the side walls are stacked in horizontal position along the base. The cross members are extended over the side walls to receive retaining posts provided adjacent opposing edges of the base. The wing nuts are then screwed onto the retaining posts to hold the article carrier in a flat, compact orientation.

It is clear that the article carrier of the present invention advantageously provides rough, as well as fine pivotal adjustment of the side walls, thereby providing support and security to hold various shapes and sizes of articles in an upright position. Also, it is equally clear that the present invention may be broken down and stored in a compact form when not in use. This allows it to be easily stored in the car, thereby guaranteeing its availability to the owner when needed.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the preferred embodiment of the invention, an example of which is illustrated in these drawings.

DETAILED DESCRIPTION OF THE INVENTION

Figure 1:
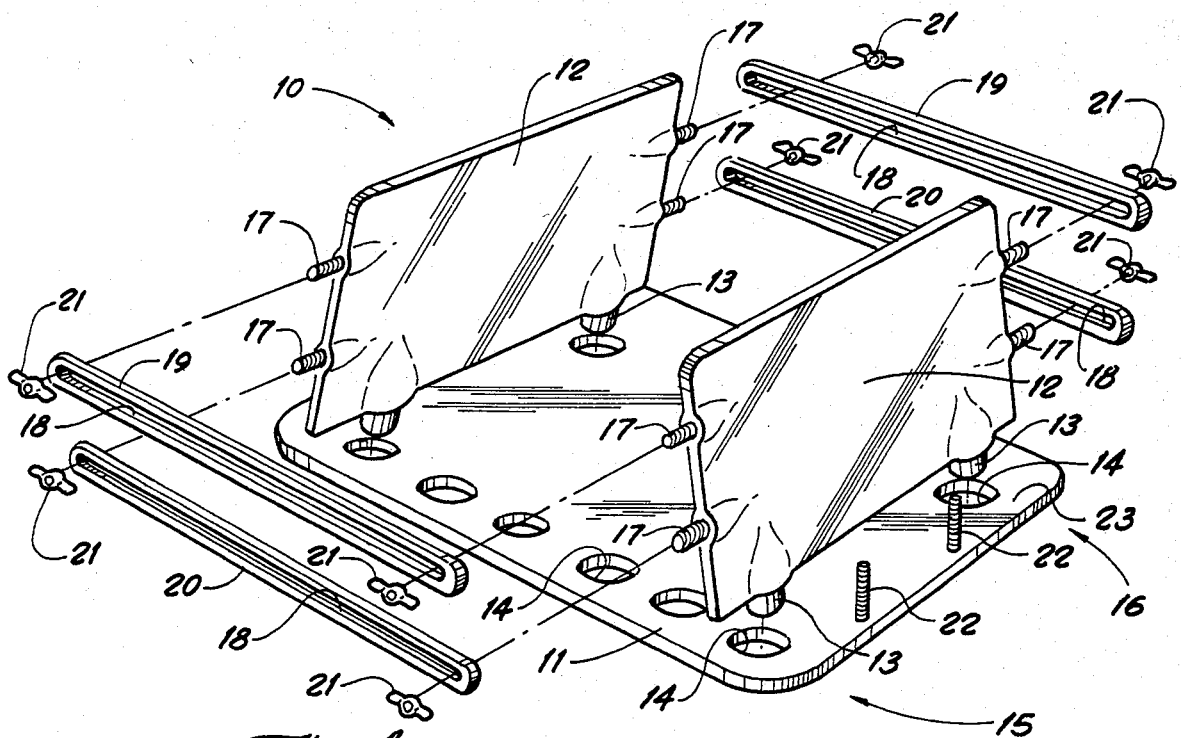
FIG. 1 is a perspective and exploded view of the article carrier of the present invention.

Reference is now made to FIG. 1 showing a portable and adjustable article carrier of the invention for providing maximum flexibility, security and support in maintaining articles of various sizes and shapes in an upright position. The article carrier 10 includes a base member 11 and a pair of side walls 12. A pair of mounting pegs 13 extend downwardly from the bottom edge of each side wall 12. The pegs 13 are aligned with and selectively received in a pair of apertures 14. The apertures 14 may be drilled or formed in base member 11 in two parallel rows generally designated by reference numerals 15 and 16. Preferably, the pegs 13 fit loosely in the apertures 14, thereby allowing some pivotal adjustment between the side walls 12 and the base member 11. This feature allows the side walls 12 to be inclined outwardly to allow easy insertion of the articles between the walls, and then pivoted inwardly toward each other, thereby providing a high engagement line and improved security against the tipping over of tall articles.

The side walls 12 also include at least one or more connecting pins 17 extending outward from the two side edges thereof. In the drawings, two pins are shown extending from each side edge. The pins 17 are received into elongated slots 18 found in upper and lower cross members 19 and 20. Preferably, slot 18 is a continuous longitudinal slot running nearly the entire length of the cross members 19 and 20. Of course, apertures could be provided at spaced intervals along each cross member. These apertures would each be capable of receiving a connecting pin. The continuous longitudinal slot 18 is preferred, however, as it provides infinite adjustment of the side wall position. It should also be realized that only one cross member could be provided at each end of the article carrer, if desired.

Preferably, connector pins 17 are threaded and of sufficient length to extend through slot 18 beyond cross members 19, 20. Wing nuts 21 are then provided to secure the position of the side walls along the cross members by screwing onto the connecting pins 17 and tightening to clamp the cross members 19, 20. Due to the range of adjustment provided by the connecting pins 17, continuous slots 18 and wing nuts 21, the position of the side wall members can be secured in any required article clamping position following pivotal adjustment.

Figure 3:
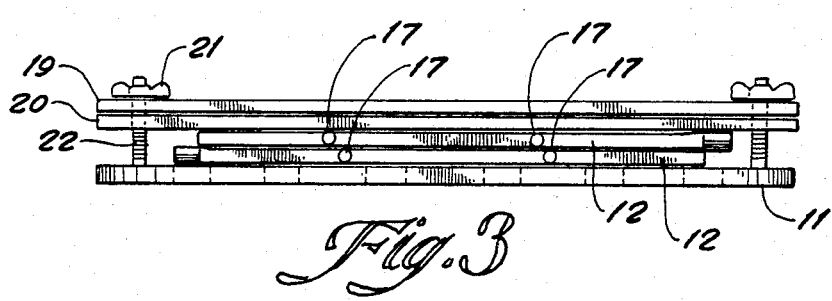
FIG. 3 is a side elevational view of the present invention showing the article carrier broken down for storage when not in use.

Finally, a pair of threaded retaining posts 22 are provided adjacent opposing edges of the base member 11. These posts extend upward from the upper surface 23 of base 11 and are of a length greater than the thickness of the combination of both side walls 12 and cross members 19 and 20 (as shown in FIG. 3). When not in use, the side walls 12 of the article carrier 10 may be pulled out of the base 11 and stacked horizontally on the base. The cross members 19 and 20 may then be placed over the side walls 12 so that the retaining posts extend through slot 18. The wing nuts 21 are then screwed onto retaining posts 22 and tightened against the cross members 19 and 20 so as to secure the article carrier 10 in a compact orientation for storage.

Figure 2A:
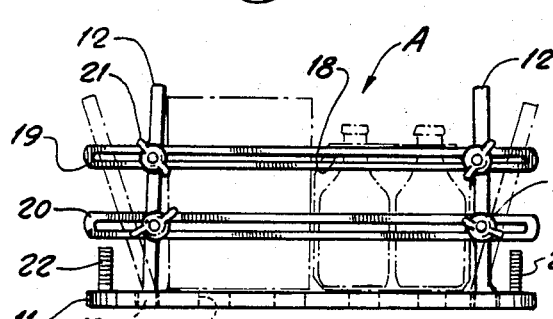
FIG. 2A is a side elevational view of the article carrier of the present invention showing the distance between the side walls along the base at its maximum and with articles in place.
Figure 2B:
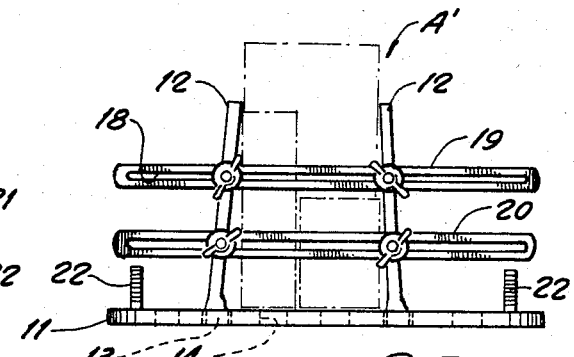
FIG. 2B is an additional side elevational view of the article carrier of the present invention showing the side walls of the article carrier in an intermediate position, the distance therebetween being less than shown in FIG. 2A.

As can best be seen in FIGS. 2A and 2B, when in use, the article carrer of the present invention allows for pivotal adjustment of the side walls 12 toward and away from the articles being supported. The distance between the side walls 12 may be roughly adjusted by plugging the connecting pegs 13 into selected pairs of apertures 14 along the two parallel rows 15, 16.

In FIG. 2A, the side walls are in their extreme position; i.e. the walls are substantially as wide apart as possible in an effort to enclose all of the articles A. Also, FIG. 2A shows the side walls tilted slightly inwardly so as to frictionally engage the pins 13 against the sides of the apertures. At the same time, the walls 12 compressively engage against the sides of the articles adjacent the tops thereof. This clamping action coupled with tightening of the wing nuts 21 renders the assembled carrier substantially rigid, and thus very stable and secure.

The articles A are engaged adjacent the top obviating any tipping or wobbling action due to outside forces, such as momentum forces acting on the articles A due to stopping or turning of a vehicle in which the carrier is being used. The walls 12 are held against sidewise, as well as upward movement, until the wing nuts 21 are released. This allows walls 12 to swing outwardly as shown in phantom line outline of FIG. 2A. In this position, the articles A can be easily removed. Also, of course, the articles are most easily loaded with the walls 12 tilted outwardly.

FIG. 2B shows the side walls 12 positioned in intermediate apertures 14 along the base 11 to secure articles of a lesser width. In this instance, the side walls are also pivoted toward each other in relation to the base 11 to support articles A' in a secure upright position.

In summary, the article carrier 10 of the present invention allows for pivotal adjustment of the side walls 12 so that various shapes and contours of articles may be supported in a secure upright position. Further, the article carrier may be made of lightweight material such as plastic or wood and capable of being broken down and stored in a substantially horizontal position with the side walls 12 sandwiched between the cross members 19, 20 and the base member 11.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the cross members 19, 20 could be replaced by solid end walls including substantially continuous slots therein for receipt of the connecting pins 17. A plurality of spaced apertures could be provided in the cross members instead of the slot 18. The embodiment was chosen and described to provide the best illustration of the principles of the invention and its practical application to thereby enable one of ordinary skill in the art to utilize the invention in various embodiments and with various modifications as are suited to the particular use contemplated. All such modifications are within the scope of the invention as determined by the appended claims when interpreted in accordance with the breadth to which they are fairly, legally and equitably entitled.

I claim:

1. An adjustable article carrier, comprising
    a pair of side walls;
    a substantially continuous base including means for receiving said side walls, said receiving means allowing pivotal adjustment between said side walls and said base and adjustment of the distance between said side walls toward and away from each other along substantially the full length of said base;
    cross members for connecting said side walls at side edges thereof; and
    means for securing the position of said side walls along said cross members to clamp articles together, thereby providing support and security to hold articles of various shapes and sizes on said base.

2. The adjustable article carrier disclosed in claim 1, wherein said receiving means on said base comprises a plurality of holes in two parallel rows for receiving a pair of pegs extending from each of said side walls, said pegs being aligned with said rows thereby allowing adjustment of the distance between said side walls along said base.

3. The adjustable article carrier disclosed in claim 2, wherein said pegs fit loosely into the holes of said base thereby allowing the pivotal adjustment of said side walls with respect to said base.

4. The adjustable article carrier disclosed in claim 1, wherein said securing means comprises a plurality of connecting pins extending from both side edges of said side walls.

5. The adjustable article carrier disclosed in claim 4, wherein said securing means further comprises a longitudinal slot running substantially throughout said cross members, said connecting pins passing through said slot to allow side wall adjustment of said carrier.

6. The adjustable article carrier disclosed in claim 5, wherein said securing means further comprises wing nuts to clamp said connecting pins on said side walls in any desired position along said cross members, said wing nuts being screwed onto said connecting pins, said connecting pins being threaded.

7. The adjustable article carrier disclosed in claim 1, wherein is provided means for clamping said side walls and said cross members on said base when stacked thereon, whereby said carrier is secured for storage in a knocked-down position.

8. The adjustable article carrier disclosed in claim 7, wherein said clamping means includes a pair of threaded retaining posts provided adjacent opposing edges of said base, said side walls being adapted to lay flat on said base between the pairs of retaining posts, and said cross members being receivable over said side walls so that said retaining posts are engaged.

* * * * *